United States Patent Office 3,205,053
Patented Sept. 7, 1965

3,205,053
FUEL OIL COMPOSITION CONTAINING CORROSION INHIBITING ADDITIVE
Andrew T. McCord, Snyder, N.Y., assignor to The Carborundum Company, Niagara Falls, N.Y., a corporation of Delaware
No Drawing. Filed May 8, 1961, Ser. No. 108,247
4 Claims. (Cl. 44—66)

This invention relates to fuel oil. More particularly, it relates to a fuel oil having vanadium, sulphur or sodium contaminants and a colloidal dispersion of a corrosion inhibiting complex of a metal oxide and a fatty acid.

The use of natural and low-grade residual fuel oils in internal combustion power plants is highly desirable from an economic standpoint. In 1957 more than 540 million barrels of residual fuel oil were consumed in the United States. Unfortunately, a substantial amount of the residual fuel oil produced in the world contains large amounts of undesirable impurities; particularly, vanadium, sodium and sulphur compounds. The combustion of oils containing these impurities causes considerable damage to the equipment in which they are burned. For example, organic vanadium compounds contained in the residual fuel oil are oxidized during combustion to vanadium oxides. If these vanadium oxides are molten at the temperatures encountered in a power plant, the molten oxides will rapidly deteriorate metal and refractory parts of the equipment. The vanadium oxide will also react with sodium compounds in the fuel oil to produce sodium vanadates which may be molten at the temperatures encountered in the power plant and also have a corrosive effect on the equipment. Vanadium pentoxide will catalyze the formation of sulphur trioxide from sulphur dioxide previously formed from organic sulphur compounds contained in the residual fuel oils. The sulphur trioxide will condense with water or steam to produce a hot liquid sulphuric acid which will corrode the equipment. At times, the atmosphere in the power plant causes reduction of sodium sulphate formed by the reaction of sulphur compounds and sodium compounds contained in the residual fuel oil to sodium sulphide which acts as a corrosive agent and promotes intergranular corrosion of metal surfaces.

Many solutions have been attempted in order to alleviate the problems discussed above. In general they fall into three categories. First, the temperatures in the power plant have been maintained at a temperature below the melting point of the ash produced in the flame. However, operation at such low temperatures is very inefficient and substantially increases the cost of operation.

A second type of solution which has been utilized consists of blending residual fuel oils high in impurity content with fuel oils having low impurity content. In this manner, the impurity content of the fuel mixture may be kept in a safe range. While this method has been successful in the past, the increasing demand for residual fuel oil and the large quantity of such oils having high impurity content prevents this method from being completely satisfactory.

The third general means used to avoid the problems arising in the use of high impurity residual oil involves the addition of various additives to the residual fuel. These additives react with the impurities to form compounds having melting points higher than the temperatures encountered in the power plant. Thus, if vanadates having high melting points can be created from the vanadium oxides, the solid compounds thus made will be blown from the equipment as a fine dust and no serious corrosion problem will result. While some of the additives which had been suggested in the art have been successful experimentally in alleviating the problem, the quantity of additive which is required to effectively combine with the impurities has been excessive, making them economically undesirable.

This invention relates to the last means discussed above. It provides a fuel oil having a novel additive dispersed therein which is not subject to the difficulties previously encountered with additives. The novel additive of this invention is such that all of the additive is effective. Therefore only the exact amount of additive necessary to combine with the impurities in the fuel oil is required.

The novel additive consists of an oil-dispersible complex of a metal oxide and a fatty acid linked through a basic cation. The complex can be represented by the formula: ACOON· x (MO), wherein MO is a metal oxide, M being a metal selected from the group consisting of calcium, magnesium, strontium, barium, aluminum, zirconium, hafnium, titanium, thorium, cerium, the rare earth metals, niobium and tantalum. ACOO represents the anion of a fatty acid; N represents a basic cation selected from the group consisting of sodium, potassium, ammonium, lithium, rubidium, cesium, calcium, magnesuim, strontium and barium; and $x$ is a number greater than 1. The term "fatty acid" is utilized herein in its broadest sense and includes not only the saturated acids, both normal and branch chain, but also includes unsaturated acids, certain substituted acids, such as those having hydroxy- and keto-acid substituents, aliphatic acids containing alicyclic substituents, such as the chaulmoogra-oil acids, and certain alicyclic acids, such as the naphthenic acids, which contain no aliphatic chain. The acid will have six or more carbon atoms.

The preparation of these complexes is fully disclosed in an application filed concurrently herewith entitled "Oil-Dispersible Complexes and Their Manufacture," bearing Serial Number 108,248. Reference may be had to that application for a complete description of the manufacture. Briefly stated, the method comprises precipitating a hydrous metal oxide containing a small amount of an adsorbed basic cation. A fatty acid is added to the precipitate to produce the oil-dispersible complex.

The complexes can be solid, paste or liquid, depending upon the metal oxide and acid utilized, the amount of adsorbed basic cation and the amount of thinner, if any, used. They are directly dispersible in hydrocarbons, but are not oil-soluble.

Precipitated hydrous oxide comprises exceptionally small crystals of oxide. Only a primitive diffraction pattern is produced when the crystals are examined by X-ray diffraction methods, indicating colloidal crystals ranging from 0.1 micron to 0.01 micron. The metal oxide in the complex has the same particle size and the same is true when the complexes are dispersed in oil. These very small particles are highly reactive. They readily combine with the vanadium oxides produced during combustion of the fuel oil to create vanadates having high melting points and which are, therefore, solids at the temperatures encountered in a power plant. This vanadate ash is not molten and consequently is not corrosive. It is blown from the power plant as a dry dust and, thus, does not deposit on either metal or refractory parts. Nor do these vanadates catalyze the formation of sulfur trioxide. The sodium salts catalyze the formation of certain vanadates and enter the vanadate structure. For example, zirconium vanadate will adsorb several molar percent of sodium. In this manner the sodium is eliminated from the power plant.

The amount of additive in the fuel oil preferably ranges from about 0.05 mol equivalent to 2.0 mol equivalents of metal oxide per mol equivalent of vanadium pentoxide in the fuel. Ultimate protection is provided by employing one mol equivalent of tri- and tetra-valent oxides and two mol equivalents of the divalent oxides per mol equivalent of vanadium pentoxide in the fuel. However, some improvement is provided by lesser amounts and such amounts are therefore to be included within the scope of the invention. Likewise, although not economically desirable, an excess of oxide over the amount providing ultimate protection may be employed without any harmful effects and this is to be included within the scope of the invention also.

It is the high reactivity of the small particles which makes the complexes valuable in fuel oil. Attempts to disperse pure metal oxide particles in oil have been economically unsuccessful. Colloidal metal oxide particulates cannot be produced economically. The larger particles of metal oxide are not so highly reactive and are, therefore, inefficient since substantial excess oxide must be utilized to effectively combat the vanadium, sodium and sulphur contaminants. The same difficulties have hindered attempts to use other dry metal powders such as carbonates. Furthermore, the dry powders tend to flocculate which also decreases their efficiency.

The metal soaps, being oil soluble, are not subject to this limitation. However, the complexes of this invention are economically superior to the oil soluble soaps. They are easier to manufacture than the metal soaps. The complexes do not materially affect the physical properties of the fuel oils to which they are added, whereas several soluble soaps, particularly those of aluminum, calcium, magnesium, barium and strontium, are gel formers and tend to produce a thickening of the fuel oil.

Combinations of the colloidally dispersible oxides are also effective and, in some instances, are more effective than when used alone. This is particularly true for combinations of zirconium oxide and aluminum oxide, magnesium oxide and aluminum oxide and zirconium oxide and magnesium oxide.

The following examples will illustrate and highlight the present invention.

Example I

A laboratory test for evaluating the corrosive effects of fuel oils is conducted by burning a small quantity of oil in a Coors porcelain crucible and subsequently heating it at 650° C. If the ash so produced reacts with the crucible causing fluxing and corrosive deterioration, the same effects can be expected when the oil is burned in a power plant.

A sample of residual fuel oil containing the equivalent of 910 parts per million of vanadium pentoxide was burned in a Coors porcelain crucible, leaving a large quantity of carbon and ash. The crucible was thereafter heated to 650° C. for 18 hours. The ash melted on the wall of the crucible and was adsorbed thereby, demonstrating the fluxing action of the ash with the walls of the crucible.

The test was repeated, utilizing incremental quantities of zirconium oxide as an oil-dispersed zirconium oxide-fatty acid complex in the fuel oil. When the concentration of zirconium oxide was equivalent to that necessary to form zirconium vanadate ($ZrV_2O_7$) with the vanadium pentoxide present, the crucible was not attacked by the furnacing procedure described above. A dry, powdery residue remained in the crucible, and examination of the residue indicated that it was infusible up to 1200° C. X-ray diffraction analysis showed it to be cubic zirconium vanadate with a unit cell dimension of 8.7 Angstrom units.

Example II

In a similar crucible test, the additive consisted of a mixture of colloidal zirconium oxide-fatty acid complex and colloidal aluminum oxide-fatty acid complex in the ratio of 2 parts by weight of zirconium oxide to 5 parts by weight aluminum oxide. When the quantity of the additive was equal to 1 mol of oxide per mol equivalent vanadium oxide in the fuel, a dry fusible ash was produced and the crucible lining was not attacked.

Example III

A colloidal magnesium oxide-fatty acid complex in No. 2 fuel oil was added to a residual fuel oil in amounts equivalent to 1 mol of magnesium oxide and 2 mols of magnesium oxide per mol of vanadium oxide. In both cases, the crucible test yielded a pale yellow powder with no visible attack on the porcelain lining. X-ray data showed the presence of only one compound, which by analogy with similar patterns is considered to be magnesium vanadate. This compound exhibited a very high melting point and was able to take up considerable quantities of sodium. The X-ray diffraction analysis did not show any indication of the presence of vanadium oxide or magnesium oxide, consequently the reaction was considered complete.

Example IV

A similar test with a colloidal calcium oxide-fatty acid complex indicated that the addition of 1 mol of calcium oxide for each mol equivalent of vanadium pentoxide in the fuel oil resulted in a slight attack on the crucible lining. With the addition of two mols of calcium oxide per mol equivalent vanadium pentoxide, no attack occurred and an infusible ash remained. X-ray diffraction analysis of the ash indicated the presence of one substance, the compound calcium vanadate.

From the foregoing, it is apparent that this invention provides a fuel oil with a minimum amount of additive which completely overcomes the problems encountered due to impurities in the fuel oil. To illustrate the advantages provided by use of the novel oil dispersible metal oxide-fatty acid complexes in fuel oil, a field test was run wherein calcined zirconium oxide was ground in oil to an average particle size of about 0.3 micron. This was added to bunker C fuel oil containing sodium and sulphur and about 300–500 parts per million of vanadium pentoxide at a rate of about 4 pounds zirconium dioxide per pound of vanadium pentoxide. After two months of operation, no slag formation or intergranule corrosion was discernible. The zirconium oxide had performed an excellent job in preventing vanadium corrosion. However, from the standpoint of economy and efficiency, the quantity of additive was too high. By using colloidally dispersed metal oxide-fatty acid complexes, the efficiency and economy are increased to a point where one part of metal oxide additive per part of vanadium pentoxide provides substantially complete combination with the vanadium pentoxide to produce a high melting ash which passes through its furnace without depositing upon or corroding the metal or refractory parts thereof.

While the present invention has been described in connection with the present preferred embodiments thereof, it is subject to reasonable modification and such modifications are included within the scope of the invention as defined by the appended claims.

I claim:

1. A fuel oil containing vanadium contaminants and a corrosion preventative additive dispersed therein, said additive consisting essentially of an oil-dispersible complex of a metal oxide and a fatty acid linked through a basic cation, the metal oxide being selected from the group consisting of calcium oxide, magnesium oxide, strontium oxide, barium oxide, aluminum oxide, zirconium oxide, hafnium oxide, titanium oxide, thorium oxide, cerium oxide, niobium oxide, tantalum oxide, the rare earth oxides and mixtures thereof, said metal oxide in said complex being colloidal in size prior to as well as during dispersion in said fuel oil, said additive being present in an amount to provide sufficient metal oxide to combine with substantially all of said vanadium contaminants upon combustion of said fuel oil.

2. The fuel oil of claim 1 in which said additive is present in said fuel oil in amounts sufficient to provide from about 0.05 to about 2.0 mol equivalents of metal oxide per mol equivalent of vanadium pentoxide in said fuel oil.

3. A fuel oil containing vanadium contaminants and having dispersed therein as a corrosion preventative therefor an oil-dispersible colloidal complex of a metal oxide and a fatty acid linked through a basic cation, said basic cation being selected from the group consisting essentially of sodium, potassium, ammonium, lithium, rubidium, cesium, calcium, magnesium, strontium, and barium, the metal oxide being selected from the group consisting of calcium oxide, magnesium oxide, strontium oxide, barium oxide, aluminum oxide, zirconium oxide, hafnium oxide, titanium oxide, thorium oxide, cerium oxide, niobium oxide, tantalum oxide, the rare earth metal oxides and mixtures thereof, the metal oxide particles in said complex being colloidal in size prior to as well as during dispersion in said fuel oil and being present in substantially stoichiometric amounts to react with vanadium pentoxide to form a vanadate of the metal.

4. The fuel oil of claim 3 in which said complex is present in said fuel oil in amounts sufficient to provide from about 0.05 to about 2.0 mol equivalents of metal oxide per mol equivalent of vanadium pentoxide in said fuel oil.

References Cited by the Examiner

UNITED STATES PATENTS 2,846,392  8/58  Morway et al. _____ 44—68

FOREIGN PATENTS 761,378  11/56  Great Britain.

DANIEL E. WYMAN, *Primary Examiner.*

JULIUS GREENWALD, *Examiner.*